US008620795B2

(12) United States Patent
Veeraraghavan

(10) Patent No.: US 8,620,795 B2
(45) Date of Patent: Dec. 31, 2013

(54) SYSTEM AND METHOD FOR PROVIDING A FUTURES/FORWARD TRADABLE MARKET AND BIDDED PRICE NEGOTIATION FOR INTERNET ADVERTISING

(76) Inventor: Puthocode S. Veeraraghavan, San Francisco, CA (US)

( * ) Notice: Subject to any disclaimer, the term of this patent is extended or adjusted under 35 U.S.C. 154(b) by 0 days.

(21) Appl. No.: 13/230,648

(22) Filed: Sep. 12, 2011

(65) Prior Publication Data

US 2012/0066054 A1   Mar. 15, 2012

Related U.S. Application Data

(63) Continuation of application No. 11/973,862, filed on Oct. 10, 2007, now Pat. No. 8,099,323.

(60) Provisional application No. 60/850,964, filed on Oct. 11, 2006.

(51) Int. Cl.
*G06Q 40/00* (2012.01)

(52) U.S. Cl.
USPC ............... 705/37; 705/14.11; 705/14.18

(58) Field of Classification Search
USPC .................... 705/37, 14.11, 14.18
See application file for complete search history.

(56) References Cited

U.S. PATENT DOCUMENTS

| 7,058,602 | B1 | 6/2006 | La Mura et al. |
| 2003/0041010 | A1* | 2/2003 | Yonao-Cowan ............ 705/37 |
| 2004/0064351 | A1 | 4/2004 | Mikurak |
| 2004/0103024 | A1 | 5/2004 | Patel et al. |
| 2007/0214045 | A1 | 9/2007 | Subramanian et al. |

* cited by examiner

*Primary Examiner* — Daniel Felten
(74) *Attorney, Agent, or Firm* — Gordon & Rees LLP

(57) ABSTRACT

A system of advertising on the Internet, including: an on-line system for sellers of future advertising space to create advertising contracts; an on-line system for presenting the advertising contracts to purchasers of advertising space; an on-line system for the purchasers of future advertising space to select the sellers' advertising contracts; a system to integrate purchased advertising contracts to a delivery mechanism that displays purchasers' advertising in the sellers advertising space; and a system for transferring funds from the purchasers to the sellers after completion and audit of the advertising contracts.

3 Claims, 16 Drawing Sheets

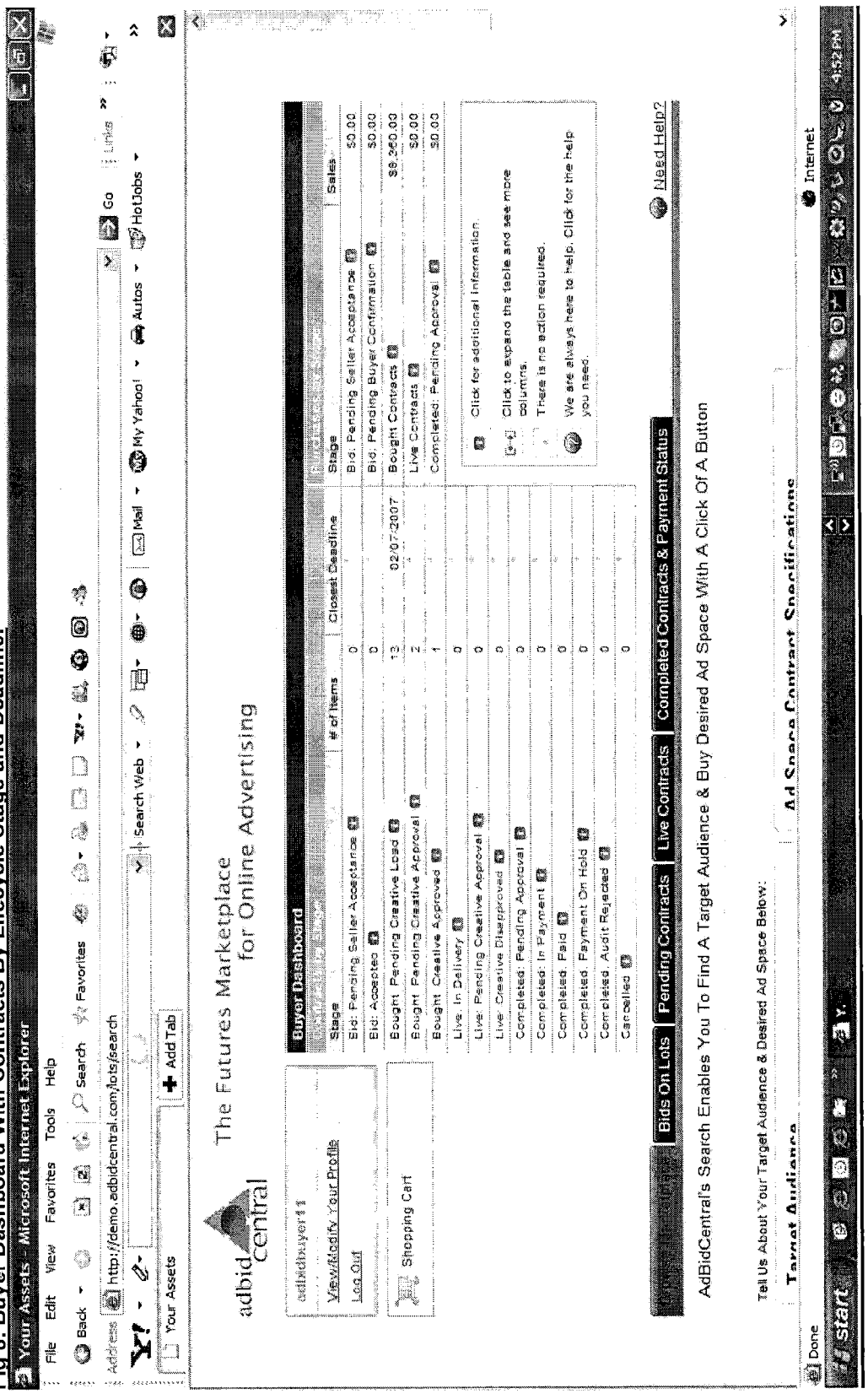
Fig. 8. Buyer Dashboard With Contracts By Lifecycle Stage and Deadline:

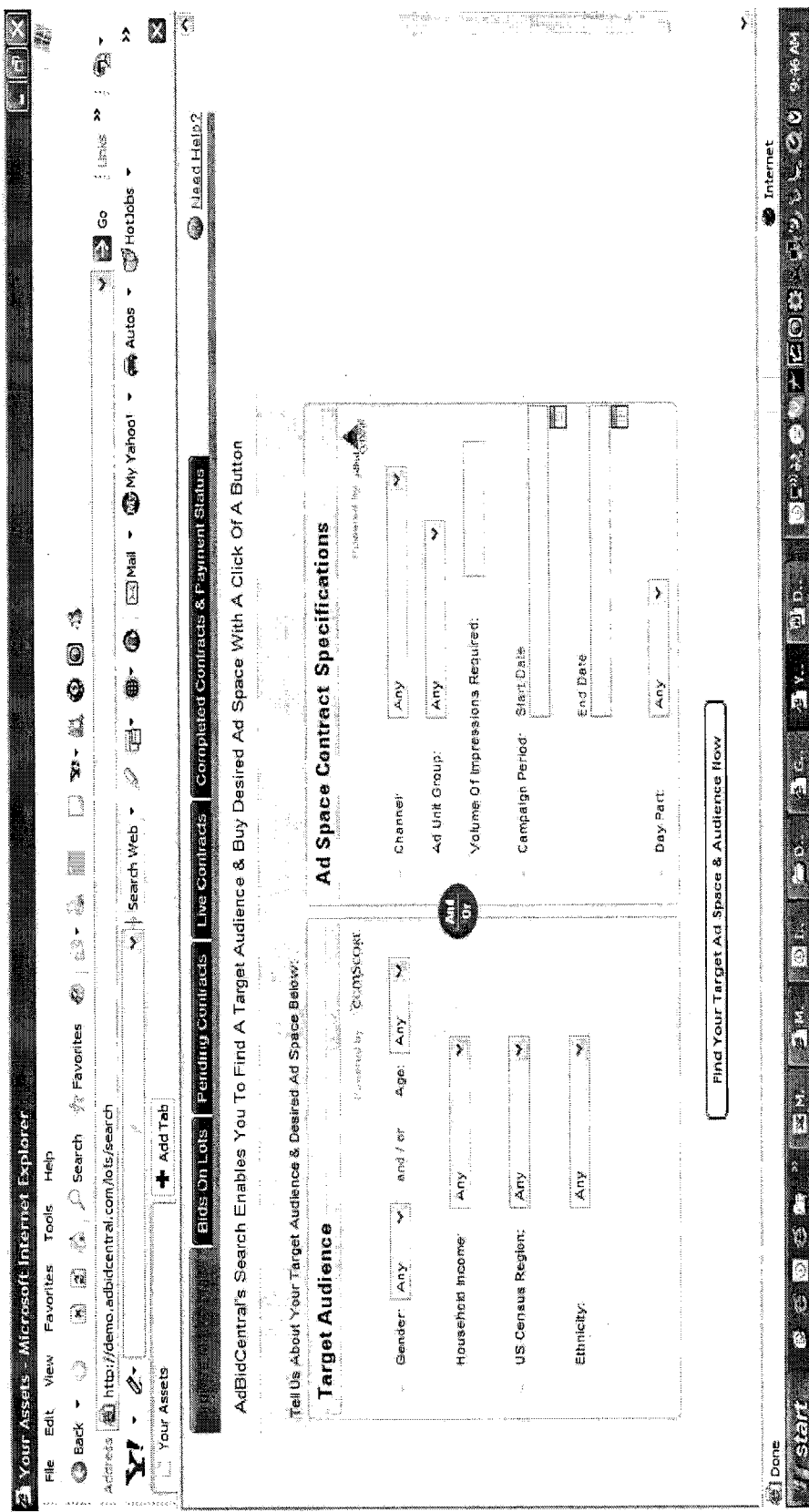
Fig 9. Buyer Search For Future Ad Space Contracts:

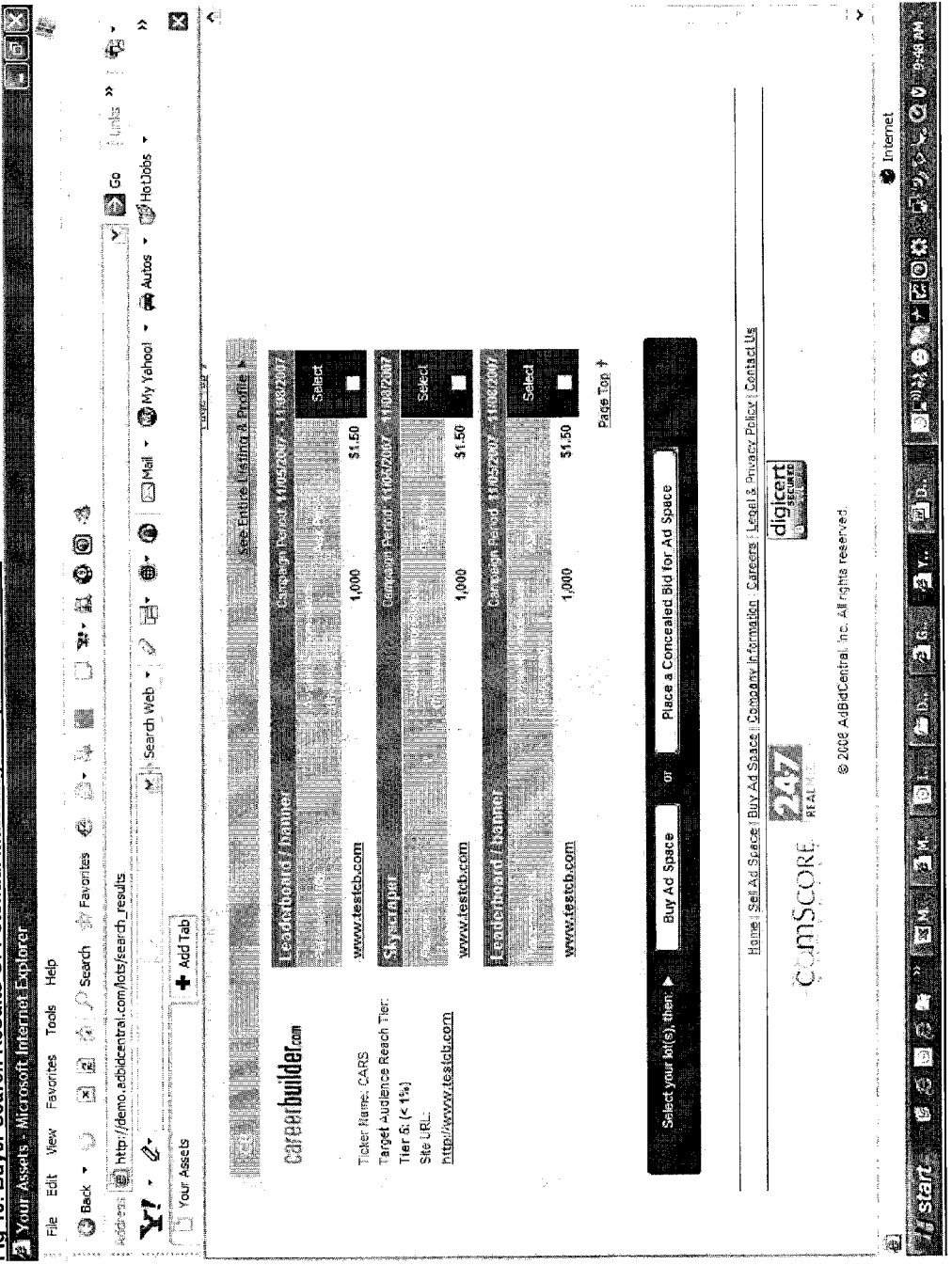
Fig. 10. Buyer Search Results Of Potential Matching Ad Space Contracts:

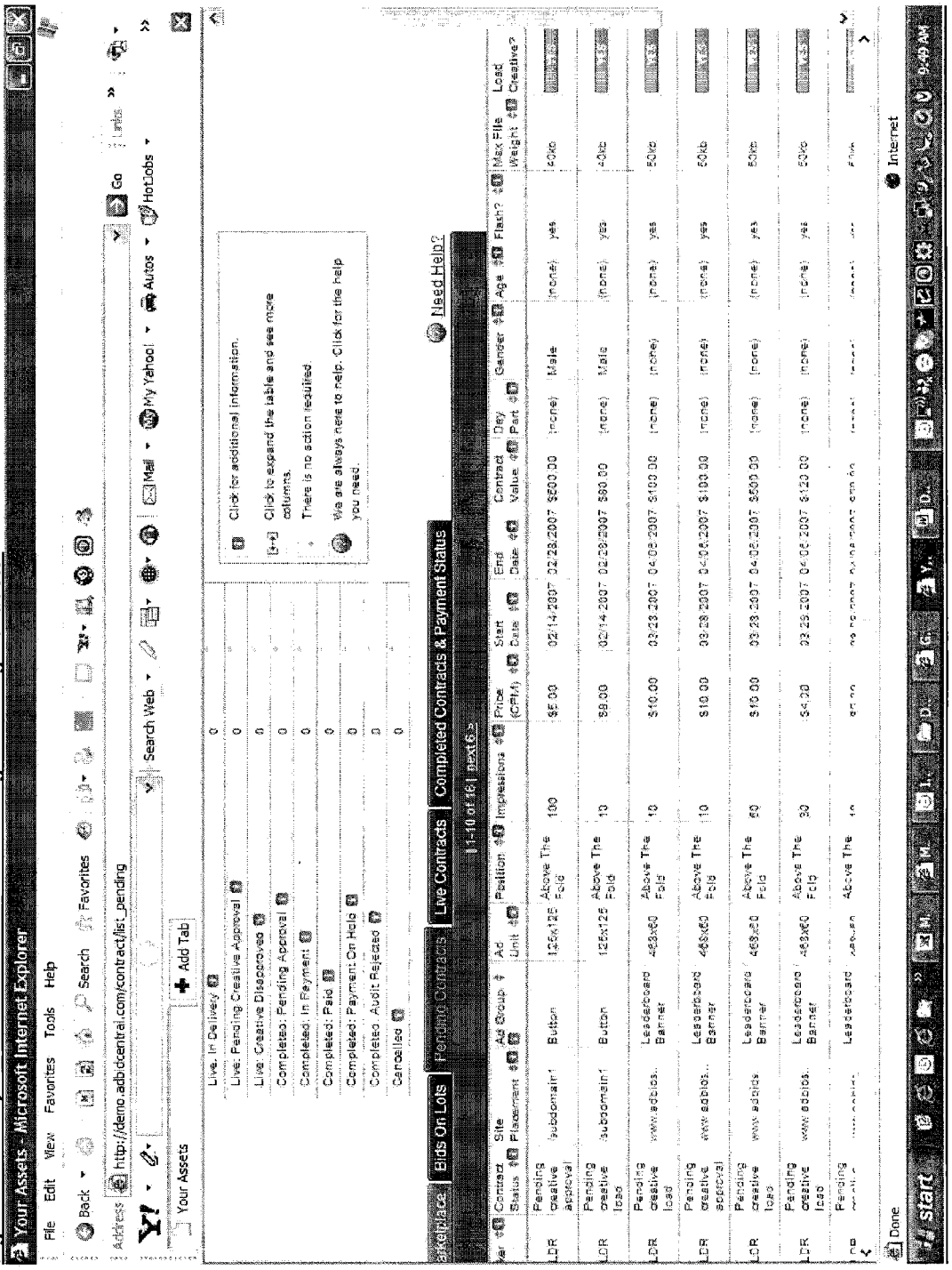
Fig 11. Part 1 Buyer Advertisement Load For Bought/Pending Contracts:

Fig.11. Part 2 Buyer Advertisement Load For Bought/Pending Contracts:
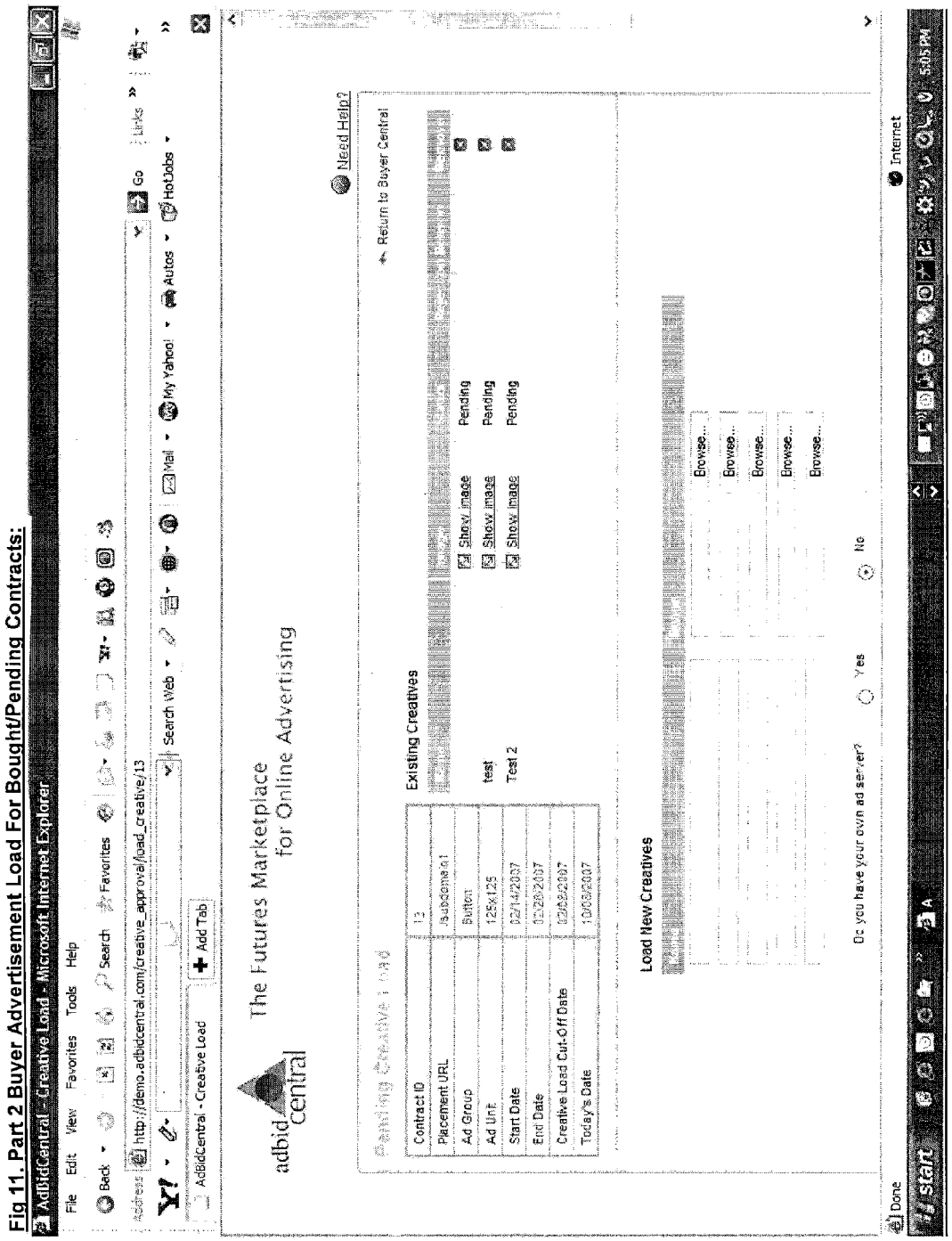

Fig. 12. Seller Dashboard With Contracts By Lifecycle Stage and Deadline:

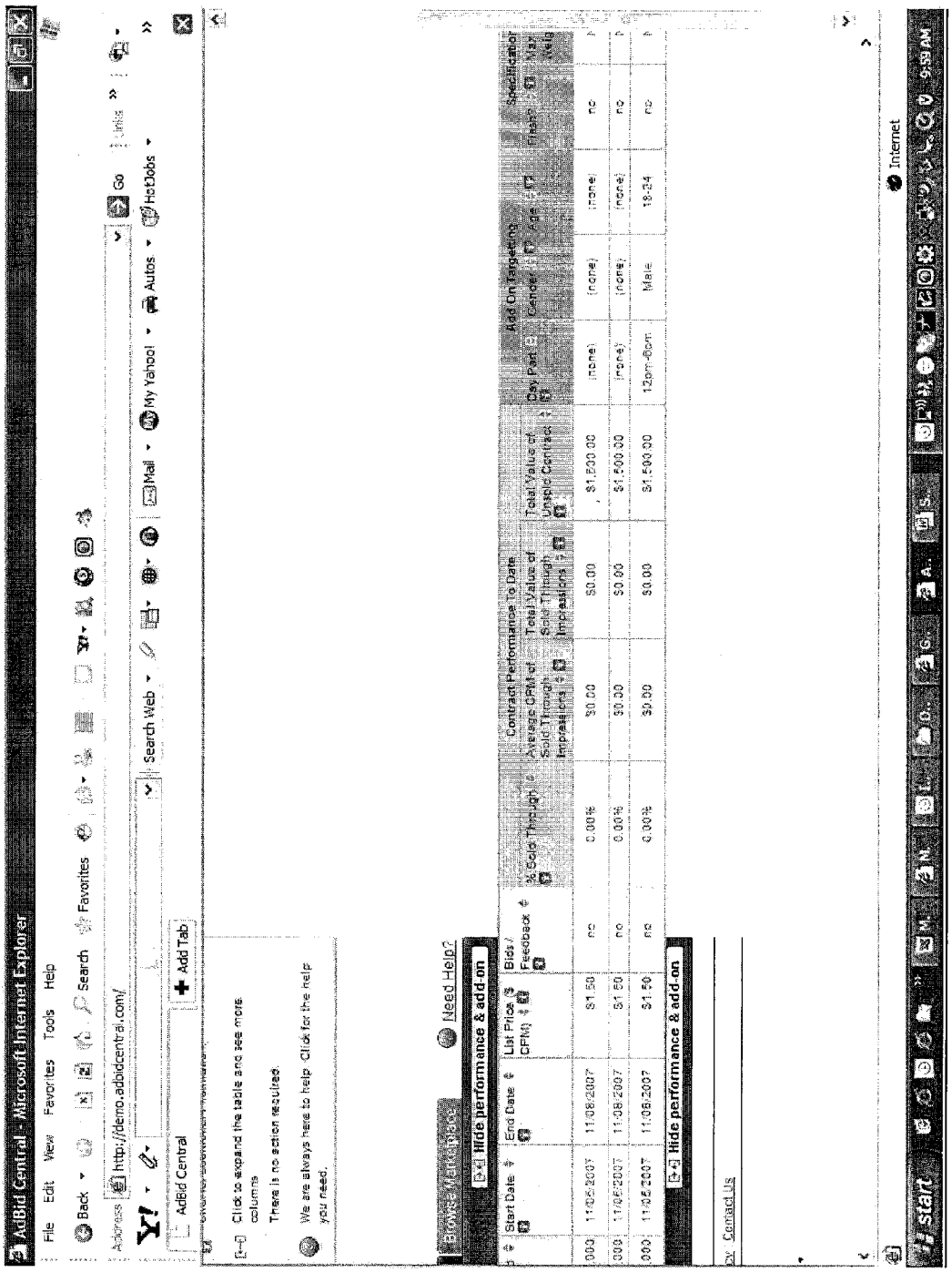
Fig. 13. Seller Dashboard With Sales Performance Indicators:

Fig. 14. (Part1) Seller Creative Approval For Bought/Pending Contract

Fig. 14. (Part2) Seller Creative Approval For Bought/Pending Contract

SYSTEM AND METHOD FOR PROVIDING A FUTURES/FORWARD TRADABLE MARKET AND BIDDED PRICE NEGOTIATION FOR INTERNET ADVERTISING

RELATED APPLICATION

The present invention is a continuation of application Ser. No. 11/973,862 filed on Oct. 19, 2007 which claims priority to U.S. Provisional Patent Application Ser. No. 60/850,964, filed Oct. 11, 2006. Both applications are of the same title entitled "A System for Providing a Tradable Market for Internet Advertising", and are incorporated herein by reference in their entirety for all purposes.

TECHNICAL FIELD

The present invention relates to an on-line system for connecting and automating processes openly between purchasers and sellers of advertising space that enables the creation of a transparent, tradable, futures or forward market for advertising space. The present invention is very useful in selling Internet advertising space, but may equally be used with a variety of digitally brokered and fulfilled ads inclusive of other traditional and new media channels, including, but not limited to, traditional media channels such as newspapers, magazines, TV, radio, billboard, movies (product placement), in-game advertising and new media channels, including, but not limited to handhelds such as wireless phones, PDAs, entertainment hand helds such as i-Pods.

BACKGROUND OF THE INVENTION

Currently, Internet based advertising wherein buyers of advertising space seek to directly transact with specific sellers is a complex, manually intensive process whereby buyers and sellers commit to purchases through largely non-automated, manual mechanisms such as telephone, e-mail and faxing of contractual terms and banner advertisement creative files or buyer tags. The advertisements are then fulfilled by loading these creatives/banners/buyer tags manually into the publisher's serving mechanisms such as an adserver, as well as manually auditing performance of the contracts and reconciling payments after delivery of the contract. Many entities that have a large Internet presence (i.e.: a large numbers of visitors to their sites) have a large sales forces selling their advertising space either directly to advertisers or to agencies and networks who represent advertisers. Surprisingly, most of the work performed by these large sales forces is quite manual intensive both on contracting for sales of the advertising space as well as in the fulfillment/loading of the advertisements for delivery per the contractual terms, and auditing performance and reconciling payments upon delivery.

Various other keyword and auction-based automated Internet advertising systems also exist. However, these systems are "closed" in that the buyers do not directly, openly interact with the sellers of adspace. An example of such a system is Google's "AdSense" system. Instead, in these systems, buyers and sellers are separated from each other by a technological system that automatically matches buyer with seller in real-time, based on a variety of parameters such as context, but does not reveal who the matched counterparty is. Moreover, as mentioned, the ad space in these systems is sold "real-time' or "spot" to the highest bidder as the impression/ hit arrives on the seller's site on that day. These systems provide an elegant means of monetizing unsold/excess inventory that the direct sales force of the site was unable to sell directly to a buyer prior to that date on which the impression/ hit arrives on the page.

The direct sales force of the seller typically sells inventory in the future, well before the impression or hit arrives on the site. Using forecasted estimates of future site hits/views volume data, the sales force works directly, through manual processes, with advertisers, agencies and buyers to ensure sell out of these ad impressions, prior to those impressions/hits arriving. Note, in this manual process, both buyer and seller have full transparency on who the related parties are. When inventory goes unsold through direct sales, or sudden excess above forecast is experienced on the site, that inventory is deployed into "closed" real-time bidding systems such as Google's AdSense™, Yahoo's RightMedia™, to "fill" the remaining, unsold inventory on a real-time basis.

As stated above, inefficiencies exist for large, direct sellers of Internet advertising space (due to existing processes being complex and paper intensive). In addition, however, inefficiencies also exist for small sellers and purchasers of Internet advertising space. For example, for those website operators that have a small presence (i.e.: a small numbers of visitors to their sites), or a smaller direct sales force organization, it has proven harder to seek out purchasers for their advertising space. This is partially due to the fact that it is desirable that purchasers' advertisements "match" with the content of the sellers' websites. For example, someone wishing to post advertising relating to technology products would want to display such advertising on websites devoted to technology. It is difficult for small sellers of advertising space to seek out purchasers for their advertising space as they do not have an automated means or large enough sales force through which to efficiently communicate future ad space availabilities to a broad reach of potentially matching advertisers or ad space purchasers.

In addition, it has proven hard for purchasers of Internet advertising space to seek out small sellers of such advertising space. This is partially due to the fact that it has also proven difficult for small sellers of advertising space to seek out purchasers whose advertising suitably "matches" their websites.

Finally, purchasers of future ad space today often find that they are unable to efficiently resell the unwanted excess ad inventory (i.e. through automated means). Excess future ad inventory in purchasers' hands today results from anticipated business needs failing to materialize or alternatively due to the purchased inventory failing to perform to the advertisers' expectations. There are no systems currently that enable an efficient resale of this excess or unwanted future inventory, for a means of reducing financial asset exposure to that inventory or for the purposes of extracting an economic profit from that inventory. No adspace futures trading capabilities exist today.

What is instead desired is a more centralized system of openly/transparently matching sellers and purchasers for future/forward sales of Internet advertising space as a complement to the activities of the seller's direct sales force. It is especially desirable that such a system would assist both small purchasers and small sellers of advertising space, such that purchasers and sellers could quickly and easily find one another over the Internet. Such a system would ideally function as a tradable, futures/forward market for the buying, selling and reselling/trading of Internet advertising space.

SUMMARY OF THE INVENTION

The present invention provides a marketplace for the buying, selling and reselling/trading of future delivery/forward delivery advertising space on the Internet, or with a variety of digitally brokered and or fulfilled advertisements inclusive of other traditional and new media channels.

In one aspect, the present invention provides an end to end system of advertising on the Internet, comprising: an on-line system for sellers of future advertising space to create advertising contracts; an on-line system for transparently/openly (ie revealing the party's identification) presenting the advertising contracts to purchasers of advertising space; an on-line system for the purchasers of future advertising space to select the sellers' advertising contracts; a system that enables price negotiation between parties; a system to integrate purchased advertising contracts to a delivery mechanism that displays purchasers' advertising in the sellers advertising space; and a system for transferring funds from the purchasers to the sellers after completion and audit of the advertising contracts.

In optional aspects of the invention, contract generation and selection by seller, as well as contract identification by purchaser can be automated through the use of marketplace driven information, that provides a means of "analytical intelligence" for buyer and seller. Such "analytics" systems as described herein could be similar to Amazon's system of suggesting other potential books to buy, or Priceline's suggestions on suitable bids for an airline ticket. The analytics engine provides feedback based on statistical data both local to the user's performance in the marketplace and heuristic data across the marketplace as a whole, that enables the users to make more informed purchasing or sales decisions.

In various aspects of the invention, the contract details may include, but are not limited to, any the following: a placement URL, a contract start date, a contract stop date, a contract price, a minimum number of impressions (i.e. "hits") guaranteed by the seller, the type of advertising space (e.g.: leaderboards, banners, rectangles, pop ups, pop unders, interstitials, in video, skyscrapers), any out clauses related to performance of the contract and a content description.

The purchasers of advertising space can re-sell the advertising contracts, creating a true "tradable market" for the buying, selling and reselling/trading of advertising space contracts.

The present system includes a system for auditing the completion of the advertising contracts prior to transferring funds from the purchasers to the sellers.

Optionally included in the present invention design is the ability to form consortiums of purchasers to purchase advertising space contracts together from a single seller or consortium of sellers; or consortiums of sellers to sell advertising space contracts together to a single purchaser or consortium of purchasers. The present system may also enable consortiums to be formed and dissolved for individual transactions, for example a single contract purchase or sale, as well as for multiple transaction purchases or sales. This feature of the present invention is particularly beneficial to small purchasers and sellers of Internet advertising space (but may equally be used by larger purchasers and sellers) who may choose to aggregate their ad space interest to achieve mutually aligned business goals.

Included in the present invention is the optional ability for terms of the various advertising contracts to be accessible such that they can be viewed by parties other than the two parties to the contract. This is particularly advantageous in that the performance of purchasers and sellers can be publicly tracked. Moreover, the advertising contract formed between purchasers and sellers may optionally be publicly traded. This further assists in creating a true "tradable market" for the buying, selling and reselling/trading of Internet advertising space.

Alternately, included in the present invention is the ability for the terms of the various advertising contracts to be concealed such that they cannot be viewed by parties other than the two parties to the contract. This may be desirable to protect the privacy interests of the parties and to avoid potential pricing conflicts that may arise due to different channels of sales reaching the same buyer.

In various aspects of the invention, purchaser's bids on advertising contracts will be "concealed" (such that the purchaser's bids are only seen by the seller, who also is provided information on the identity of the bidder), and not be "transparent" or "open" to the entire marketplace (such that the purchaser's bids may be seen other parties using the present market system), like in the case of users of eBay. Unique to this system is the ability for purchasers to submit a "concealed" bid for the inventory where the bid amount is below the listed price/rate of the seller. In addition, the purchaser, when placing a "concealed" bid, can provide a bid expiration date, a time by which the seller is required to respond the purchaser's offer. Therefore, the system uniquely automates the manual price negotiation process between buyer and seller for future ad space, while maintaining the integrity of the revealed ceiling price to the broad marketplace so as to avoid potential pricing conflicts. Moreover, acceptance of a buyer's price negotiation offer/bid by the seller triggers an option for a buyer to purchase the contract within a specified time, currently arbitrarily implemented as 2 business days. This creates for the purchaser the option to conclude/execute the accepted price negotiated bid by the seller, or, ignore this accepted offer, to thereby avoid purchasing the contract from the seller. This latter unique feature enables "riskless" bidding for buyers who now can place bids/price negotiation offers to multiple sellers, and choose to only execute on a selected sub-set of the accepted bids by sellers.

As an illustrative example of the above in effect, a buyer is presented with 10 matching ad space placements on 10 different sites when conducting a query through the system for ad space. The buyer then submits 10 concealed bids through the system for those 10 ad spaces and offers a lower price than listed on the market for each individual ad space contract. Five sellers of the ad space reject the buyer's bid/price negotiation offer. Five sellers accept the buyer's bids/price negotiation offer. From the five sellers that accepted the bid for ad space, the buyer then chooses 3 to execute/finalize the trade. Therefore, the buyer rejects 2 accepted bids from sellers, and is not required to purchase those contracts. In summary, the buyer therefore can choose a wider pool of inventory to bid on, and avoid purchasing all accepted bids by sellers. The 2 items of ad space inventory rejected by the buyer are not bought/executed and automatically relisted on the marketplace after an arbitrary holding period, defined as 2 business days currently.

In addition, in various aspects of the invention, sellers ad space offerings on advertising contracts may either be "concealed" (such that the seller's offerings are only seen by specific marketplace participants), or be "transparent" or "open" (such that the seller's offerings may be seen all parties using the present market system).

BRIEF DESCRIPTION OF THE DRAWINGS

FIG. 8 is a screenshot of the buyer dashboard system interface.

FIG. 9 is a screenshot of the search interface through which buyers find ad space contracts.

FIG. 10 is a screenshot of the system interface buyer search results of potentially matching ad space contracts.

FIG. 11 is a screenshot of the system interface for loading advertisements/creatives for bought/pending ad space contracts.

FIG. 12 is a screenshot of the seller dashboard system interface.

FIG. 13 is a screenshot of the seller dashboard system interface that tracks ad space sales performance indicators.

FIG. 14 is a screenshot of the system interface for seller review and authorization of loaded advertisements/creatines for bought/pending ad space contracts.

DETAILED DESCRIPTION OF THE DRAWINGS

Figure 1:
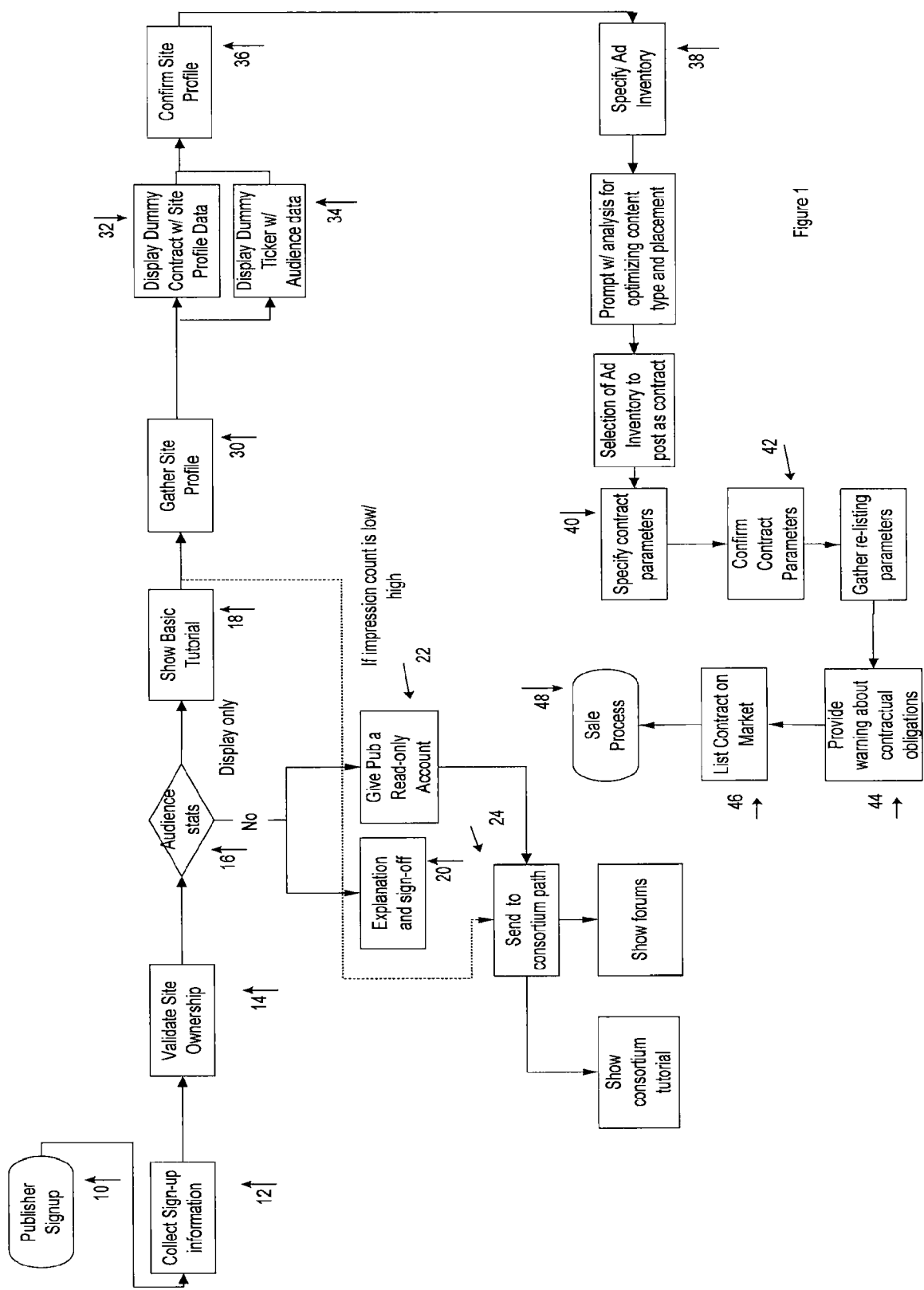
FIG. 1 is a flow chart overview of an aspect of the present system showing the process a seller of Internet advertising space complies with when signing up on-line, describing and generating a profile of their website properties, specifying the advertising inventory of their website, and generating a proposed advertising contract.

FIG. 1 is a flow chart overview of an aspect of the present system showing the process a seller of Internet advertising space complies with when signing up on-line, describing and generating a profile of their website properties, specifying the advertising inventory of their website, and generating a proposed advertising contract, as follows.

A potential seller of Internet advertising space (a.k.a. a "publisher") signs up to use the present on-line system at step 10. Upon sign up, information about the seller is collected at step 12. Such information may include, but is not limited to contact information, login information, banking information and EIN/SSN, channel and sellable ad space information of the seller. In addition, the present invention may optionally collect current market information about ad space sales price experienced by seller through other means such as direct sales through sales forces as well as use of other, non-direct means of sales. Next, at steps 14 and 16, the present system validates that the seller is the owner of the website(s) he/she claims to be. This may be done by requesting the seller to download and place a pixel on their website to indicate actual control and authority to access the underlying website space.

Once the potential seller has been validated, they may optionally be shown a basic tutorial of the features of the present system at step 18. Alternatively, the potential seller may be disqualified (step 20), or they may be given a read-only count (step 22) and sent to a path to form a "consortium" with other sellers (to be explained more fully below in connection with FIG. 5). This procedure may optionally be also done when the impression count (i.e. "number of expected hits on the website") is high. Also, third party information on seller's site audience and profile may be used to automate the filtering or approval process.

Should the potential seller be approved at steps 14 and 16, and having viewed the optional tutorial (step 18), information of their site profile may be gathered at step 30. Such information may include various aspects of the sellers audience and ad space information. In optional aspects of the invention, third party providers may "power" the information populated about the seller within pre-decided, but not limited to, fields such as: page views per month, unique visitors, reach, total time spent, time spent per unique visitor, as well as demographic and psychographic audience information such as gender, regional origin, household income, ethnicity as well incidence of children.

In optional aspects, a system of tagging the site for future purposes of trading of contracts related to the site is provided. Specifically, this may include the selection of a ticker that represents the advertising space assets of the publisher. This ticker can optionally be a combination of words and numbers and characters, and can be set to be of various lengths, as desired. The system of tagging assets to contracts for future trading is an important advantage of the present invention, and it assists in providing a truly tradable market for advertising contracts.

Next, a profile of the website desired by the potential seller can be generated (either with profile data, or with third party information accepted by the seller). Other options are also possible. Next, the desired site profile can be confirmed (step 36).

The potential seller can then specify their advertising inventory (step 38). This would include specifying the content type (Flash, Image, Animated page, etc.) as well as desired advertising contract parameters (step 40). For those situations where the system enables sales of text-ads within text boxes, the publisher may provide keywords to describe the site. These keywords can be verified by the present system through a combination of automated review of the underlying meta descriptors of the site, an automated tool that reviews the content within the site to verify the keywords selected, as well as a manual, human review of the seller's site. The advantages of reviewing the keywords submitted are two fold: to ensure that the seller's ad space assets are appropriately tagged/profiled within the present system to ensure consistency for buyers on searching for these assets, and to provide "analytical intelligence' that can enhance the ability for sellers to achieve a sale through possible effective selection of keyword descriptors about their site.

The contract parameters are then confirmed (step 42), warnings about contract obligations may be attached (step 44) and the contract listed on the on-line marketplace (step 46) to be sold to a purchaser (step 48). In order to refine the selection of contract parameters, such as pricing, the system automatically prompts the seller with suitable contractual options to consider, based on information tracked on the current dynamics within the marketplace and the seller's goals. This analytics system provides the data to allow sellers to select an advertising space "trading" strategy. Moreover, the information required to generate these "analytics" is tracked by the marketplace system to enable effective selling decisions for sellers/resellers.

Figure 2:
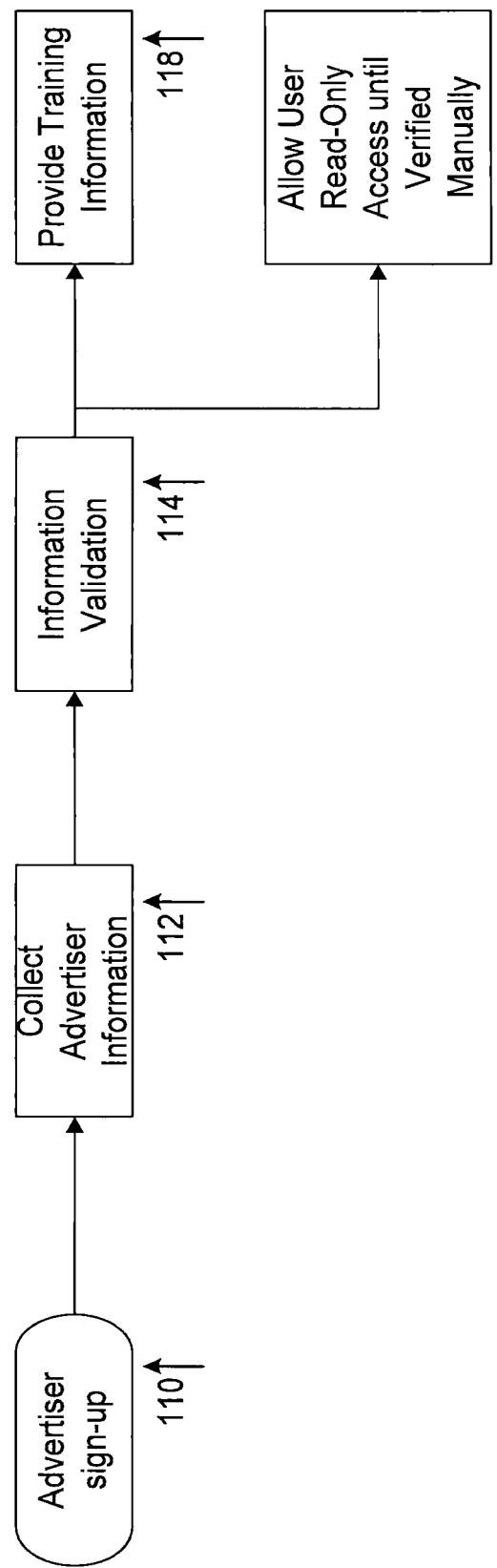
FIG. 2 is a flow chart overview of an aspect of the present system showing the process a purchaser of Internet advertising space complies with when signing up on-line.

FIG. 2 is a flow chart overview of an aspect of the present system showing the process a purchaser of Internet advertising space complies with when signing up on-line, as follows.

A potential purchaser or reseller of Internet advertising space (a.k.a. an "advertiser/buyer/reseller") signs up to use the present on-line system at step 110. Note that a seller could also participate in the marketplace as a buyer and vice-versa. Upon sign up, information about the purchaser is collected at step 112. Such information may include, but is not limited to sellers' login information, bank account or credit card information, tax information and desired ad space. Next, at step 114, the present system validates that the purchaser or reseller is the owner of the credit card specified for the account or the bank account provided by the purchaser or reseller. This may be done by a quick authorization and refund mechanism enabled through the selected merchant gateway provider for the credit card or the automated clearing house provider.

Once the potential purchaser has been validated, they may optionally be shown a basic tutorial of the features of the present system at step 118.

Figure 3:
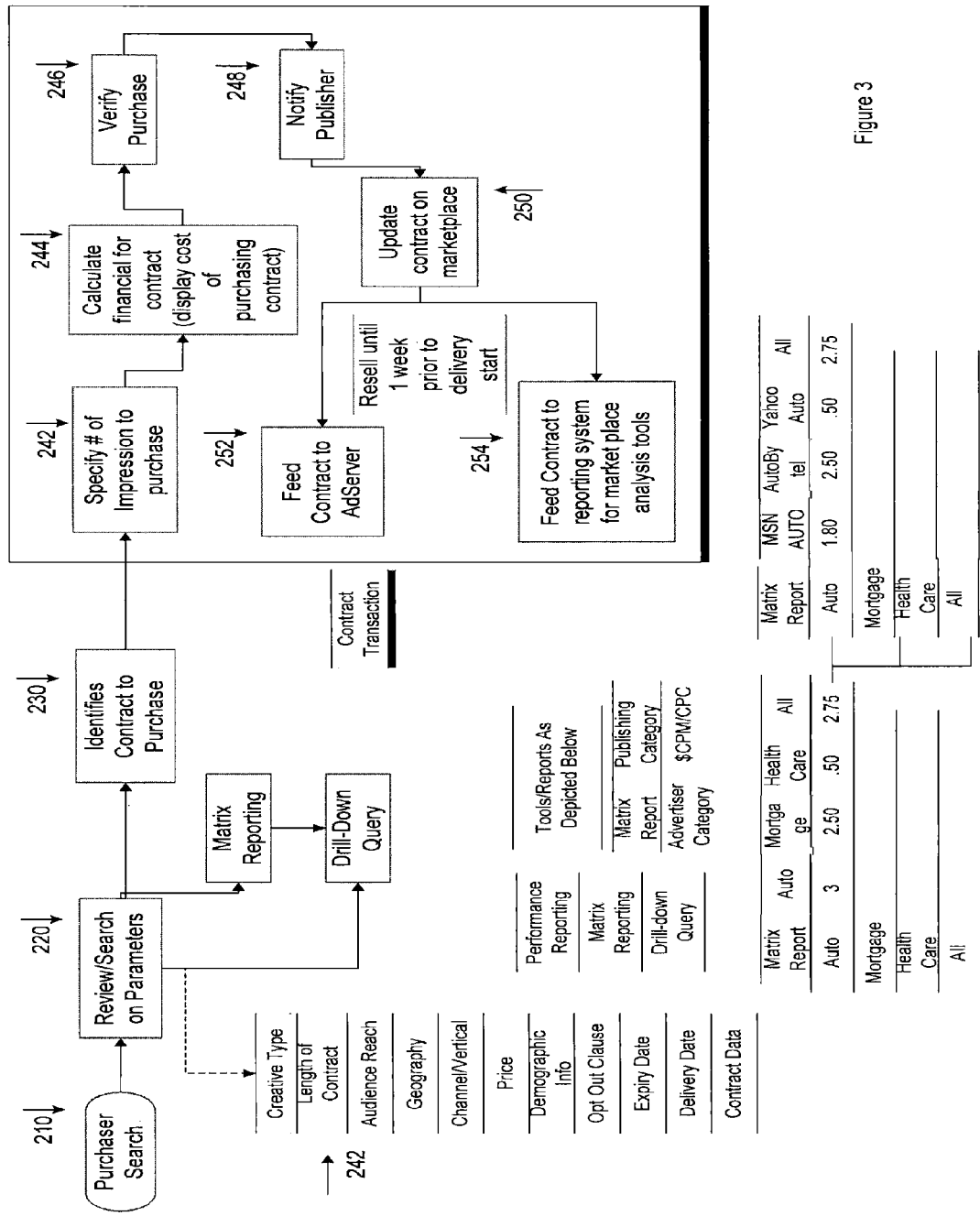
FIG. 3 is a flow chart overview of an aspect of the present system showing the process a purchaser of Internet advertising space performs when first selecting and bidding on a proposed advertising contract, and then preparing their advertising for display on the seller's website.

FIG. 3 is a flow chart overview of an aspect of the present system showing the purchasing and bidding process a purchaser/reseller of Internet advertising space performs when purchasing or bidding on a proposed advertising contract, and then preparing their advertising for display on the seller's website, as follows. It is to be understood that the present system comprises both a "buy or concealed bid" market. In other words, a potential purchaser can either buy the advertising contract or place a bid with expiration dates for it, similar to price negotiating between parties.

In various aspects of the invention, purchaser's bids on advertising contracts will be "concealed" (such that the purchaser's bids are only seen by the seller, who also is provided information on the identity of the bidder), and not be "transparent" or "open" to the entire marketplace (such that the purchaser's bids may be seen other parties using the present market system), like in the case of users of eBay. Unique to this system is the ability for purchasers to submit a "concealed" bid for the inventory where the bid amount is below the listed price/rate of the seller. In addition, the purchaser, when placing a "concealed" bid, can provide a bid expiration date, a time by which the seller is required to respond the purchaser's offer. Therefore, the system uniquely automates the manual price negotiation process between buyer and seller for future ad space, while maintaining the integrity of the revealed ceiling price to the broad marketplace so as to avoid potential pricing conflicts. Moreover, acceptance of a buyer's price negotiation offer/bid by the seller triggers an option for a buyer to purchase the contract within a specified time, currently arbitrarily implemented as 2 business days. This creates for the purchaser the option to conclude/execute the accepted price negotiated bid by the seller, or, ignore this accepted offer, to thereby avoid purchasing the contract from the seller. This latter unique feature enables "riskless" bidding for buyers who now can place bids/price negotiation offers to multiple sellers, and choose to only execute on a selected sub-set of the accepted bids by sellers.

Thus, when the present patent application describes examples of "bidding", such examples are understood to equally include "buying", or vice versa.

Returning to the above example, a potential purchaser starts a search of available advertising contracts (step 210) by reviewing or searching contract parameters (step 220) as well as audience target parameters, such as impressions/month, household income etc.

A variety of exemplary contract parameters are listed at step 224. It is to be understood that this list is merely exemplary, and is not limiting. Within the identification process of a suitable target contract that meets the sellers' needs across a variety of exemplary parameters, the system generates an "analytical recommendation" of possible contract performance data to further consider in making the purchasing decision. This may include a variety of tools that illustrate the possible projected performance of the contract based on relevant, historical tracked data, thereby providing a means of "analytical intelligence" in the purchasing decision. Thus, a further benefit of the present invention is that the information required to generate these "analytics" is tracked by the marketplace system to enable effective buying decisions for buyers.

After a potential purchaser has identified a desirable advertising contract to purchase, the purchaser may complete the purchase of the advertising contract (step 240) as follows. The purchaser may first specify the number of impressions (step 242) and submit this to the system. The system then calculates the financial cost of the advertising contract, verifies the availability of purchaser funds to purchase the advertising contract, and notifies the publisher of the sale (step 248), and updates the contract on the marketplace (step 250). In optional implemented aspects of the invention, the purchaser is enabled to purchase any number of the total impressions for sale, provided the purchaser submits a purchase at or above the minimum volume of impressions per sale specified by the seller. The system then automatically ensures that all purchases occur above the minimum volume required of the seller. Next, the contract can be fed to both an adserver (step 252) and a reporting system for market place advertising tools that powers the analytical engine described above for effective buyer and seller contracting decisions.

Figure 4:
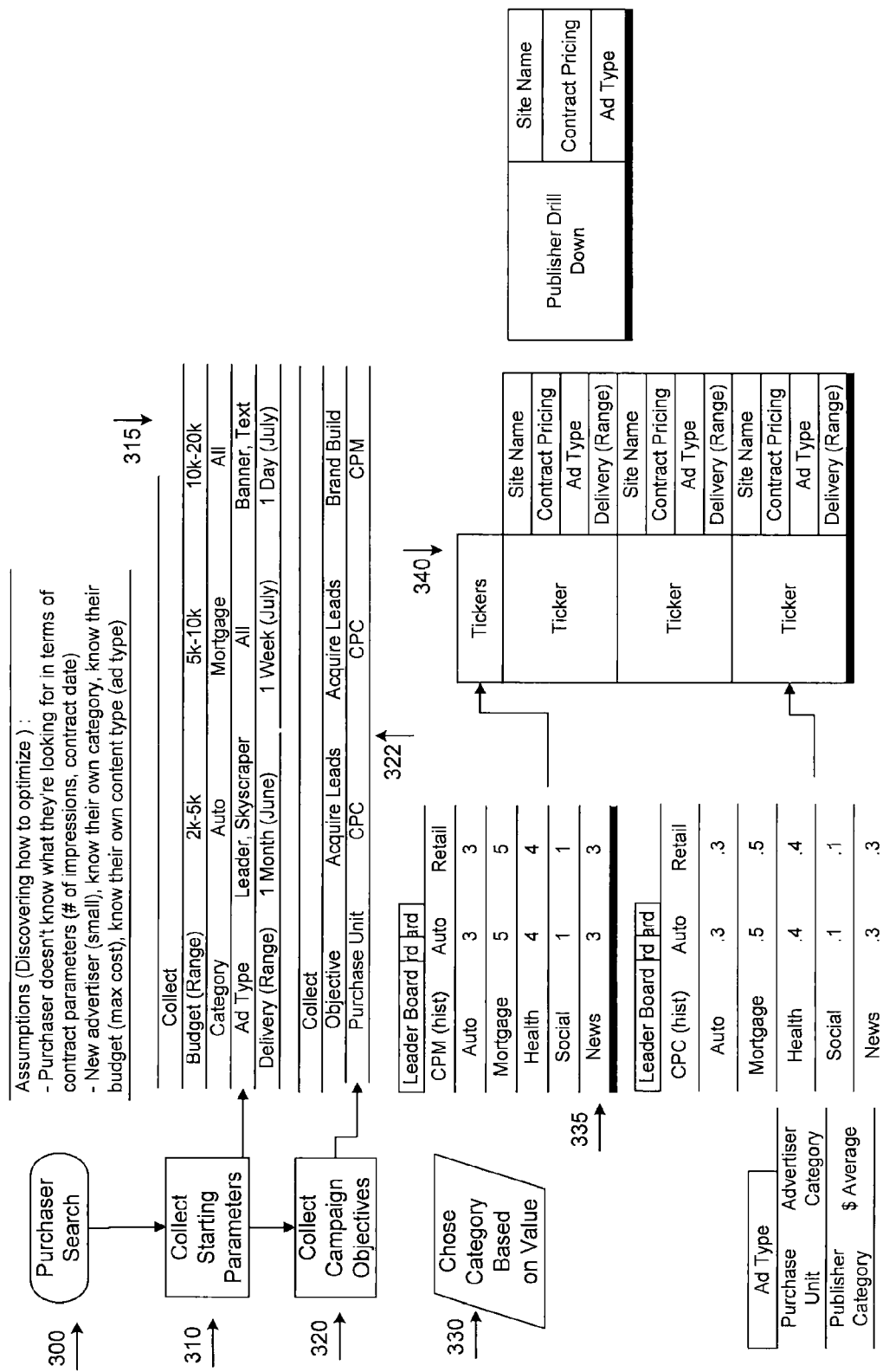
FIG. 4 is a flow chart overview of an aspect of the present system showing the process a purchaser of Internet advertising space performs when first searching for a suitable seller of Internet advertising space.

FIG. 4 is a flow chart overview of an aspect of the present system showing the detailed process of provision of "analytical intelligence" to a purchaser of Internet advertising space. First, a purchaser starts a search for suitable sellers at step 300. The purchaser begins by collecting or organizing sellers desired contractual parameters (step 310). For example, the purchaser may select potential advertising contracts on the basis of their budget, the advertisement type (leader, skyscraper, banner, etc.) or the period of time during which the contract is delivers (step 315). It is to be understood that the exemplary parameters shown in step 315 are merely exemplary and are not limiting. As such, other parameters may be included or excluded from those illustrated. Next, at step 320, the purchaser may collect sellers campaign objectives, including, but not limited to acquiring leads or building a brand (see 322). Next, at step 330, the purchaser may optionally choose a particular seller(s) website based upon how the website has been categorized by the seller. For example, as shown in step 335, various keywords describing the "type" or "subject matter" of the website may be used. In addition, at step 340, the purchaser(s) can select the seller's "ticker". Such "ticker" may be a simple short alphanumeric code, similar to the four letter codes assigned to companies trading shares on stock exchanges. By associating such ticker codes with various sellers (and potentially purchasers), and by optionally permitting the buying and selling of advertising contracts to be "open" or "transparent" such that they may be viewed by parties other than just those in the contract, a tradable market for advertising contracts can be created.

Figure 5:
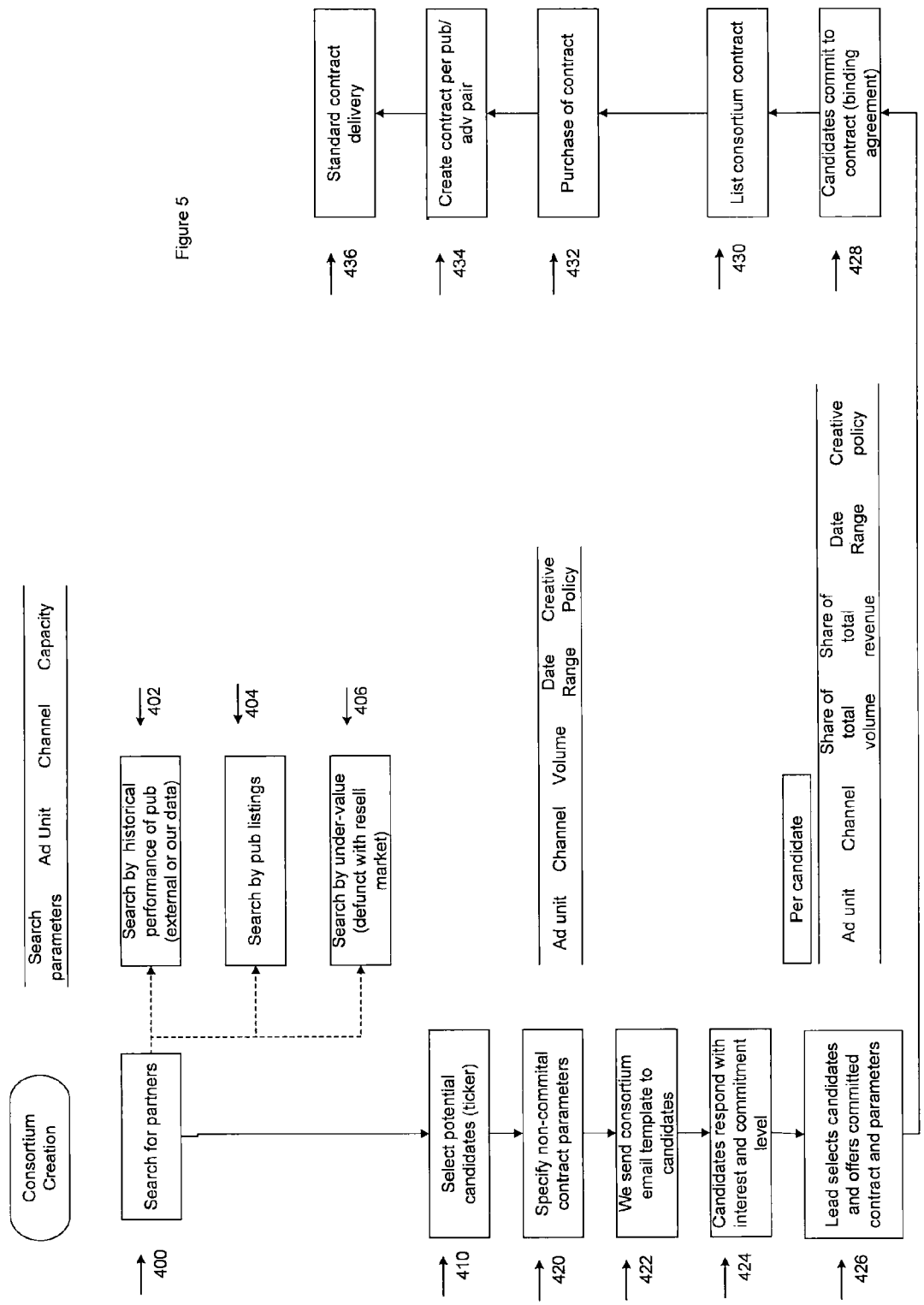
FIG. 5 is a flow chart overview of an aspect of the present system showing the process of forming a consortium of either purchasers or sellers of Internet advertising space.

FIG. 5 is a flow chart overview of an aspect of the present system showing the process of forming a consortium of either purchasers or sellers of Internet advertising space. This is an automated system by which buyers and sellers can collaborate to achieve a combined buy or sale of advertising space assets. The system enables consortiums to be formed and dissolved for individual transactions, for example a single contract purchase or sale, as well as for multiple transaction purchases or sales.

First, a purchaser or a seller begins to search for partners (step 400). Such search can optionally be done by searching historical performance of public data (step 402) within the system of seller/purchaser performance or by searching the system for suitable seller/purchaser profiles based on audience traffic information, not limited to, page view volumes, audience channel, expected pricing, size of funds available for buying, target audience sought in a consortium buy etc. or by searching publisher/seller/buyer listings within a community forum on the site to identify buyers/sellers looking for consortium partners (step 404) or by searching for undervalued seller assets by using various tools provided by the system to identify suitable targets based on specified parameters, such as historical sales price, volume of sales etc. (step 406) Searches for potential selling partners can also be carried out by selecting potential candidates by a ticker that tags ad space assets to a particular seller (step 410).

Next, the party seeking to form a consortium can specify non-committal contract parameters (step 420). An e-mail template can then be sent to potential candidates (step 422). The potential candidates can respond with their interest and commitment level (step 424). The automated process enables both consortium sellers and buyers to agree to template-based terms by which they will engage with each other to achieve their set objectives. These terms can include, and are not limited to, volume of sellable impressions contributed to contract, revenue share agreements, amount of buying funds contributed, etc. Next, the party seeking to form a consortium and who initiated the process receives commitment levels from various contacted parties, and either receives an interest to participate or a rejection. From the candidates who express interest, the consortium initiator uses an automated process to select the parties that are included in the consortium for the particular buy or sell transaction. Next, these selected potential candidates commit to the contract terms (step 428) through an automated agreement that is generated and accepted.

In the case that the consortium consists of a group of sellers, their consortium contract can be listed (step 430), and purchased (step 432) by buyers. Once purchased by a single buyer, or a buyer consortium, the sold consortium contract is divided according to the consortium contract terms agreed between parties (such as volume of impressions contributed), as well as revenue share agreements (such as percentage of revenue shared for impression contribution), such that the consortium contract is split into sub-contracts between individual sellers and the buyer/buyers.

In the case that the consortium consists of a group of buyers, upon purchase of a suitable seller contract by the consortium, their consortium contract terms agreed to, such as but not limited to percentage share of bought contract for funds contributed, are used to split the bought contract into sub-contracts between individual buyers and the seller/sellers.

Thus, the advertising contract is then automatically created between the purchaser(s) and seller(s) at step 434, and is then delivered at step 436.

Figure 6:
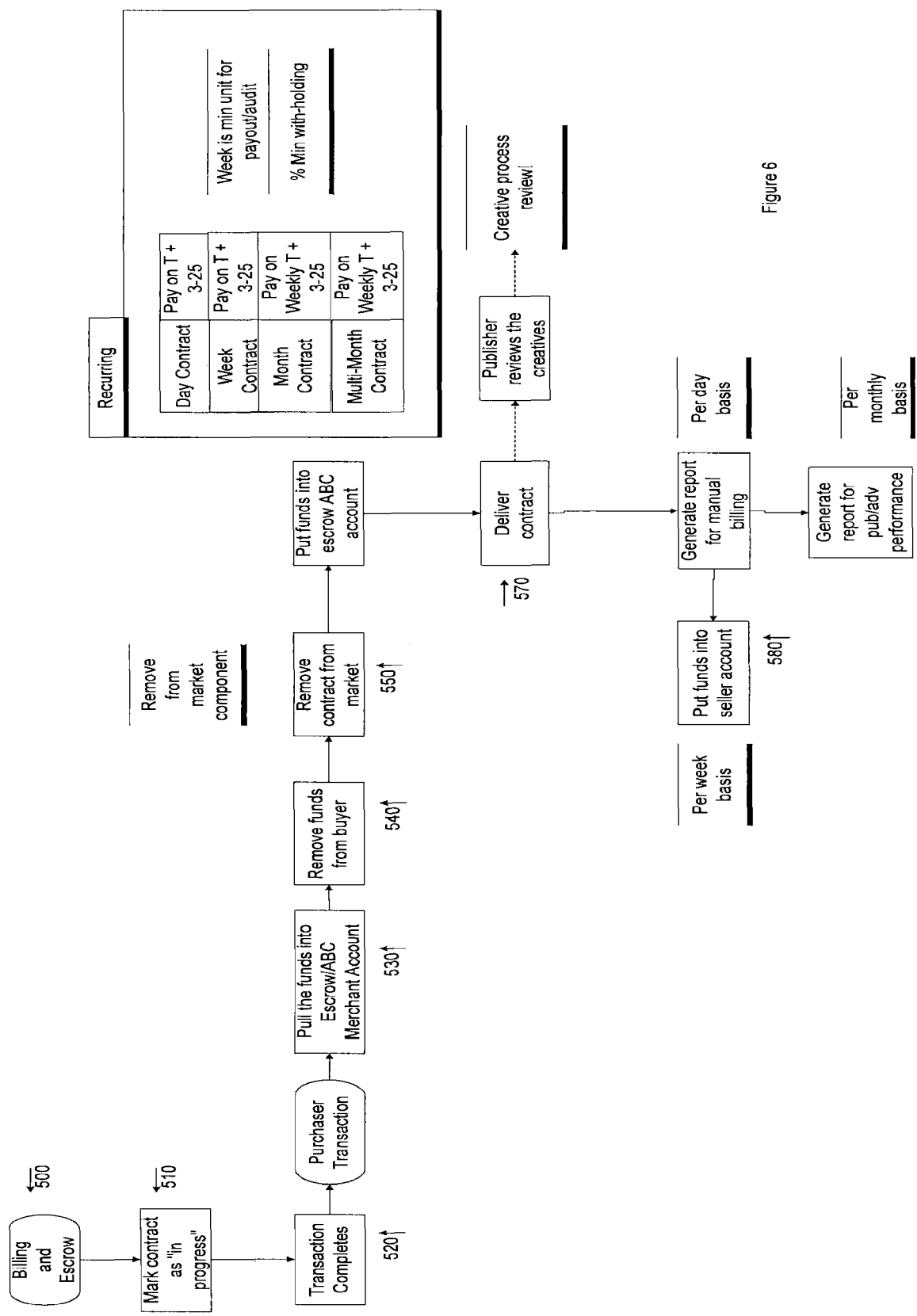
FIG. 6 is a flow chart overview of an aspect of the present system showing the process of transferring funds from a purchaser to a seller.

FIG. 6 is a flow chart overview of an aspect of the present system showing the process of transferring funds from a purchaser to a seller, as follows. When a buyer submits a buy order, the system checks if the buyer has funds available to complete the purchase, and places the contract order purchased 'in progress" (step 510). The transaction is then completed (step 520), the purchaser's funds are placed into a merchant escrow (step 530), and removed from the buyer (step 540). Next, the contract is removed from the market (step 550). When fund verification is received, the buyer's funds are moved to the system's bank account fund (step 560), where it is held until delivery (step 570) and audit of the contract, prior to paying the seller (step 580).

In optional aspects of the present invention, a flexible payment and commission structure can be offered to sellers participating in the present system.

Figure 7:
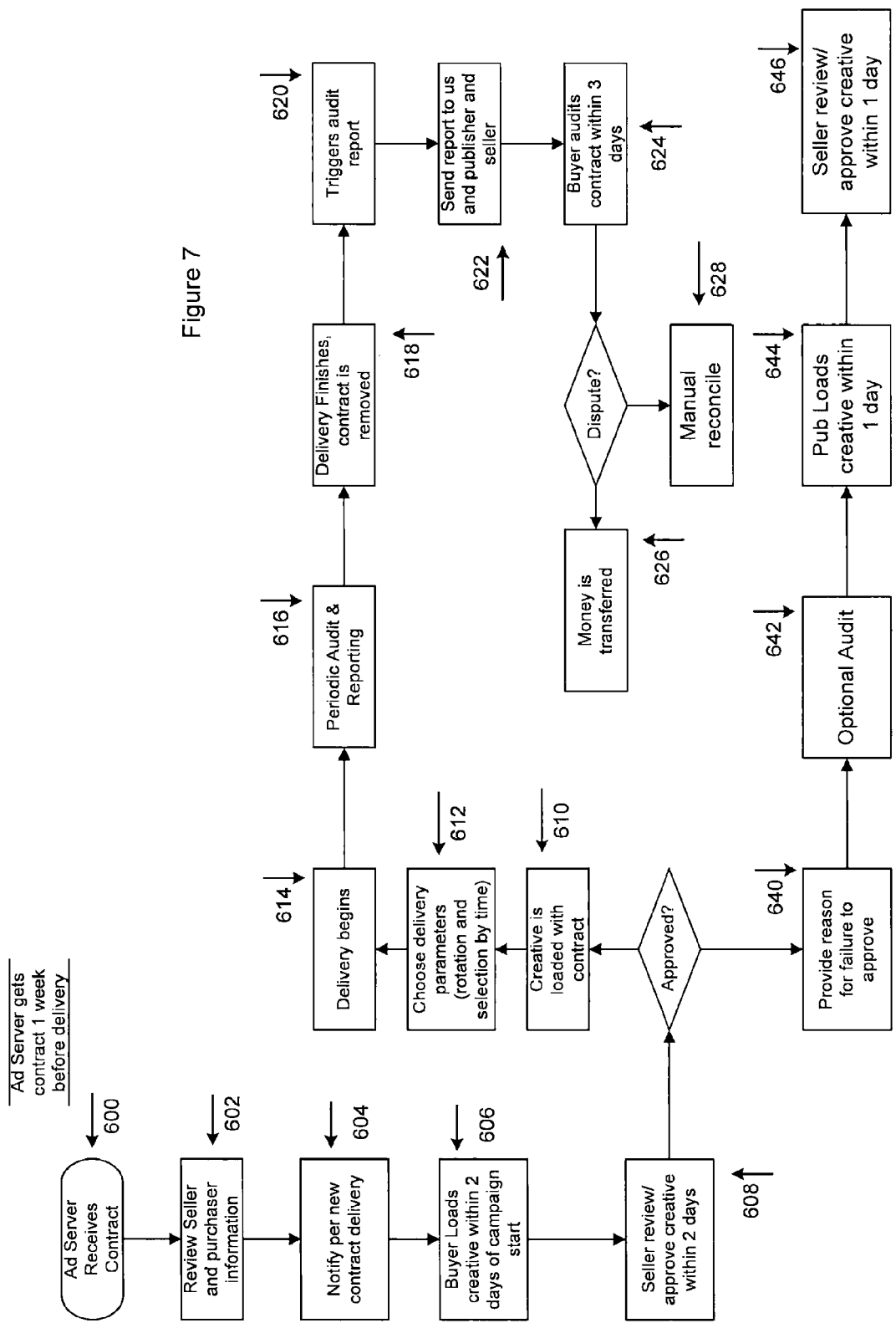
FIG. 7 is a flow chart overview of an aspect of the present system showing a process of delivering and auditing the completion of an advertising contract.

FIG. 7 is a flow chart overview of an aspect of the present system showing a process of delivery and auditing the completion of an advertising contract, as follows.

First, the adserver receives the contract (step 600). Next, the adserver reviews the purchaser and seller information (step 602). Next, the purchaser and seller are notified of the delivery of the advertising contract (step 604). Next, the purchaser delivers their advertising creatives to the seller (step 606). In various embodiments of this particular step, the purchasers may choose to use an already existing advertisement within a "library' structure within the system, or choose to develop a new creative/advertisement through the buyer's in-house process, or submit a request for design to a network of creative producers associated within the marketplace system or use an automated/self-service tool to self-develop the advertisement through an automated process which enables self-design.

The seller can then review and approve the advertisement (step 608) prior to the purchaser's advertising appearing on the seller's website.

Should the seller approve the advertising (step 610), the purchaser's content is then loaded onto the adserving technology as described herein together with the advertising contract. The seller can then choose delivery parameters such as, but not limited to, banner rotation and frequency capping (step 612). Contract delivery then begins (step 614) and may be periodically audited (step 616). When the advertising contract has been completed (step 618), an audit report is triggered (step 620) in which a report is sent to the system operator and to the publisher and seller (step 622). The buyer may then audit the contract (within any pre-determined time period) (step 624). If the buyer approves of the audit, funds are transferred (step 626). If the buyer does not approve of the audit, funds are not transferred, and a manual reconcile can be performed (step 628).

Returning to step 608, should the seller instead disapprove of the potential purchaser's advertisement, the seller can provide a reason (step 640). An optional audit may be conducted (step 642), and the purchaser reloads a suitable advertisement (step 644) and the seller reviews and approves so that the contract can go into delivery (step 646). The sequence of events described for creative approval of advertisements can also be followed in a similar manner while a contract is actually "in delivery" vs "pre-delivery". Thus, the present system enables an automated creative approval process in both circumstances. The present invention therefore automates the entire work-flow of creative submission, approval and ad delivery and reporting. Today, the direct sales force and ad operations organizations manually fulfill these tasks.

In summary, the present invention covers a single end to end automated system, across browsing, buying and price negotiation (bidding), creative submission and approval, integration with delivery mechanism of the publisher, reporting/tracking, audit and payment, which automates the interactions at all critical stages between buyers and sellers of all sizes who seek to sell and purchase specific, transparent future advertising spaces from specific transparent sellers. The system provides analytical intelligence to both sellers and purchasers to enable optimal buy/sell/trade decision making.

The present invention may optionally include, but is not limited to, systems that include the following ten "stages" or features":

(A) Pre-buy identification stage: The first stage includes advertising space identification by buyers based on target audience. This target audience selection may optionally be linked to various audience characteristics such as demographics, psychographics, and underlying audience volume characteristics, such as page views and uniques, and economics such as cost of impressions, that buyers desire for various purposes through advertising. In addition, the present invention optionally provides automated tools or "analytical intelligence" for buyers to automate the identification of suitable ad spaces given both audience criteria, as well as, economic criteria such as ROI derived from previous historical contractual performance of that ad space.

(B) Contracting stage 1: Upon identification of a suitable advertising space, automation of the contracting process between specific buyers and sellers of advertising space is provided within a variety of flexible and unique contracting structures for all types of advertising units as well as processes that include submissions of direct buy orders, concealed/transparent bids, as well as receipt of concealed/transparent offers or renegotiated offers to buyers from sellers.

(C) Contracting stage 1 (additional detail): Sellers are able to automate the contractual terms they can offer buyers, varying delivery specific terms, not limited to parameters such as start and end dates, types of ad units, placement, minimum volumes to be purchased, pricing for space, audience types targeted demographically or through psychographics. In addition, the automated nature of the system enables system driven provision of pricing guidance or "analytical intelligence" to sellers as well as guidance on trading terms/strategy that can enable achievement of seller specific business goals such as maximized revenue or profit.

(D) Contracting stage 2: In an automated manner, sellers are able to form "consortium" contracts, i.e. to offer up a joint contract against specific parameters to be achieved together for differing equity arrangements when purchased by an individual buyer or, a "consortium" buyer, where buyers are able to join together to increase their buying power.

(E) Resell Stage: The present system permits owners of the purchased contracts the ability to resell these contracts to other buyers for profit in an automated manner for an unlimited number of times until the point of delivery. In currently existing prior-art systems, the ability to resell contracts comprising ad space as the underlying goods is non-existent.

(F) Delivery stage 1: Upon purchase of suitable advertising space by buyers, creatives/banners are then developed by the buyers and submitted through automated means for approval to sellers, who seek to maintain the integrity and quality of advertising within their advertising space. In addition, the system provides for the ability for buyers to automate the creation process of "banners", through automated creative development submission into suppliers of creative development as well as through access to automated creative development tools, for self-service.

(G) Delivery stage 2: When creative is approved by sellers, code is automatically generated by the system for transfer or use by the seller in delivery of the contract. This code integrates directly with the serving mechanism of the seller, and may optionally be loaded in an automated fashion with minimal manual interaction. This code can also be used to monitor and report on the performance of the contract during and after delivery in an automated manner, such that performance can be monitored by buyers and sellers in real-time.

(H) Post-Delivery Reporting: Upon completion of contract delivery, contract performance data generated can be used in "post-buy" reporting, in an automated manner to provide buyers for deeper analysis on performance of contract against objectives, which may include, but is not limited to, economic (e.g. ROI) or audience specific (i.e. Reach into specific audience types defined through but not limited to demographic and psychographic criteria).

(I) Post-Delivery Reporting/Audit: Upon completion of contract delivery, the contract is audited in an automated system to ensure performance against contracted terms.

(J) Payment: Upon successful audit and review of contract performance, payment is automated in a direct manner to the seller, and automatic reconciliation is achieved. An advantage of the present invention's payment system is the "escrow" nature by which the system executes: only accepting contract purchases on availability of purchaser funds to avoid situations where buyers do not have adequate funds to pay for services, and providing payments to sellers only upon approval/audit by buyer of adequate delivery of services. This is currently not done by any system in the industry.

(K) Dashboard: In summary, the present invention covers a single end to end automated system, across browsing, buying and price negotiation (bidding), creative submission and approval, integration with delivery mechanism of the publisher, reporting/tracking, audit and payment, which automates the interactions at all critical stages between buyers and sellers of all sizes who seek to sell and purchase specific, transparent future advertising spaces from specific transparent sellers. The system provides analytical intelligence to both sellers and purchasers to enable optimal buy/sell/trade decision making.

The system also provides a dashboard which identifies every contract across the entire lifecycle described above, and provides users of the system real-time knowledge on stage of lifecycle as well as action deadlines related to these contracts. Therefore, also covered in the system is the means to monitor contract stages through the system enables a means to monitor stages through an end-to-end workflow oriented user interface tool.

Figure 14:
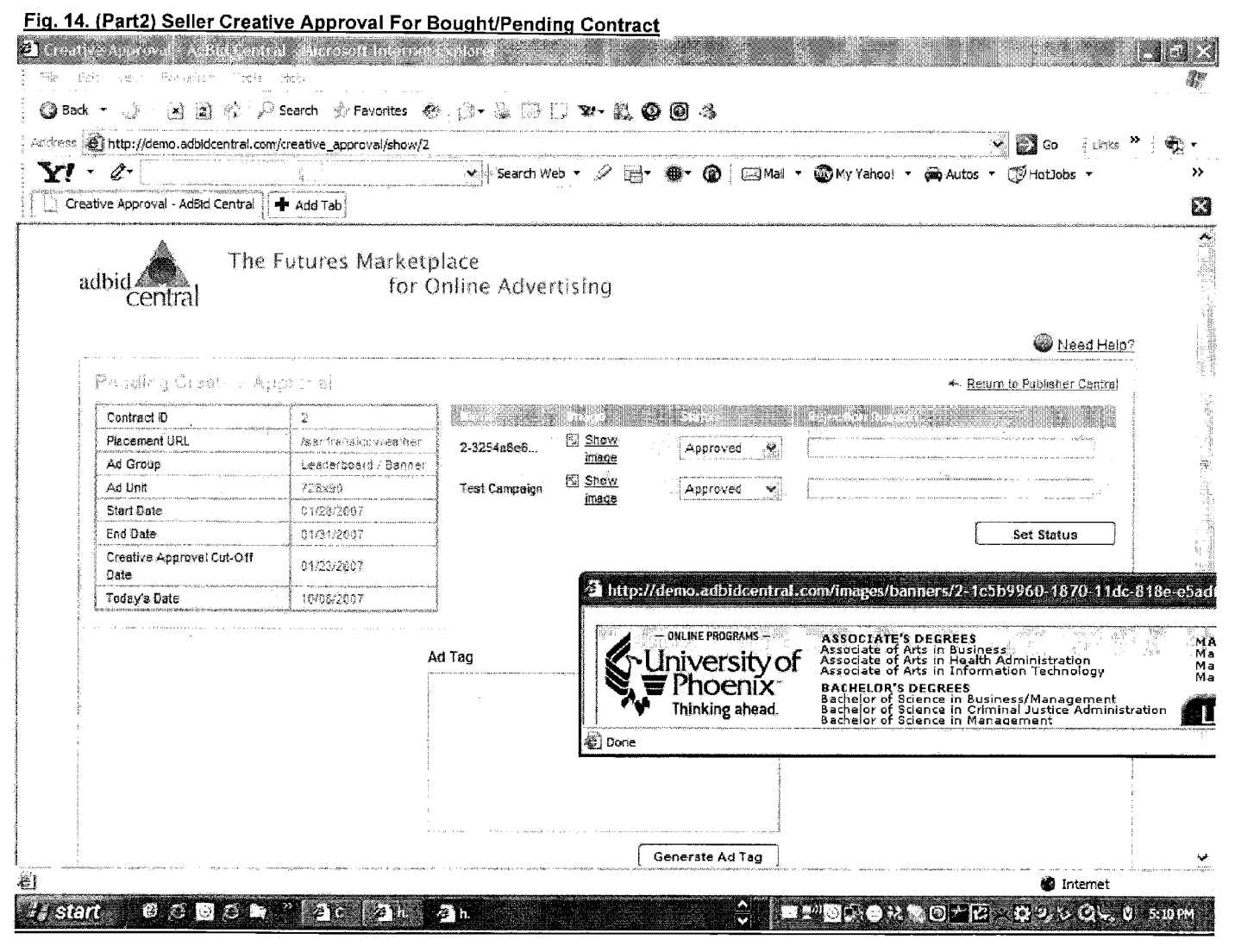

FIGS. 8 to 14 are screen shots of the present invention in operation, as follows. FIG. 8 is a screenshot of the buyer dashboard system interface. FIG. 9 is a screenshot of the search interface through which buyers find ad space contracts. FIG. 10 is a screenshot of the system interface buyer search results of potentially matching ad space contracts. FIG. 11 is a screenshot of the system interface for loading advertisements/creatives for bought/pending ad space contracts. FIG. 12 is a screenshot of the seller dashboard system interface. FIG. 13 is a screenshot of the seller dashboard system interface that tracks ad space sales performance indicators. FIG. 14 is a screenshot of the system interface for seller review and authorization of loaded advertisements/creatives for bought/pending ad space contracts.

What is claimed is:

1. A computerized system with a platform having software on a non-transitory computer readable medium which when executed by a computer operates through a web-based interface, a market of future advertising contracts, wherein the contracts are tradable or re-sellable prior to the delivery of the advertising, comprising:

a server;
an on-line system that operates on the server for sellers of future advertising space to create re-sellable advertising contracts, wherein the on-line system automatically prompts the sellers with contractual options to consider;

an on-line system that operates on the server for presenting the re-sellable advertising contracts to purchasers of advertising space;

an on-line system that operates on the server for the purchasers of future advertising space to purchase the re-sellable advertising contracts, wherein the on-line system for the purchasers of future advertising space to purchase the re-sellable advertising contracts comprises an analytics engine that programmatically enables the purchase through historical marketplace data based on statistical data of the user's performance in the marketplace and heuristic data across the marketplace as a whole, wherein the analytics are performed prior to the delivery of the advertising; and an on-line system for the purchasers of the re-sellable advertising contracts to re-sell the advertising contracts prior to performance of the advertising contracts, such that the re-sellable advertising contracts are re-sold and then delivered.

2. The system of claim 1, wherein the statistical marketplace data comprises historical advertiser performance in the marketplace.

3. The system of claim 1, wherein the statistical marketplace data comprises projected performance of the advertising contracts based on historical tracked data.

* * * * *